United States Patent [19]

Malow

[11] Patent Number: 5,188,210
[45] Date of Patent: Feb. 23, 1993

[54] MODULAR CONVEYOR

[75] Inventor: Siegmar Malow, Constance, Fed. Rep. of Germany

[73] Assignee: Licentia Patent-Verwaltungs GmbH, Frankfurt am Main, Fed. Rep. of Germany

[21] Appl. No.: 688,955
[22] PCT Filed: Sep. 7, 1990
[86] PCT No.: PCT/EP90/01508
§ 371 Date: May 15, 1991
§ 102(e) Date: May 15, 1991
[87] PCT Pub. No.: WO91/04211
PCT Pub. Date: Apr. 4, 1991

[30] Foreign Application Priority Data

Sep. 15, 1989 [DE] Fed. Rep. of Germany ....... 3930963

[51] Int. Cl.$^5$ .............................................. B65G 47/46
[52] U.S. Cl. ................................. 198/369; 198/587; 198/590; 198/600; 198/626.5
[58] Field of Search ............... 198/369, 436, 575, 587, 198/590, 591, 600, 626.1, 626.2, 626.5

[56] References Cited

U.S. PATENT DOCUMENTS

| 1,741,616 | 12/1929 | Crady | 198/369 X |
| 1,753,036 | 4/1930 | Williamson et al. | 198/369 |
| 2,232,081 | 2/1941 | Sloane | 198/600 X |
| 2,310,160 | 2/1943 | Cohen | 198/369 |
| 2,334,384 | 11/1943 | Cohen | 198/369 |
| 2,536,961 | 1/1951 | Smith | 198/600 X |
| 3,598,227 | 8/1971 | Stanford | 198/626.5 |
| 3,706,370 | 12/1972 | Bonafino et al. | 198/575 |
| 3,827,585 | 8/1974 | McWilliams | 198/587 X |
| 4,011,935 | 3/1977 | Massey | 198/369 X |
| 4,779,715 | 10/1988 | Pazdernik | 198/436 |

FOREIGN PATENT DOCUMENTS

| 0197315 | 9/1986 | Japan | 198/600 |
| 0211217 | 9/1986 | Japan | 198/369 |

Primary Examiner—D. Glenn Dayoan
Attorney, Agent, or Firm—Spencer, Frank & Schneider

[57] ABSTRACT

A modular conveyor system for the conveyance and distribution of individual items or continuous materials by means of conveyors and in particular conveyor belts. The conveyor system includes two or more conveyor modules mounted one after the other or aligned on a base frame, with each conveyor module having a rack on which a floor belt and two lateral guide belts are mounted. The rack of each conveyor module is mounted so that it can be moved relative to the base and to the other conveyor modules to discharge material from the respective conveyor module. An intermediate member is provided between each two adjacent conveyor modules and abuts each of the adjacent conveyor modules to provide a continuous conveyor path between adjacent conveyor modules.

16 Claims, 5 Drawing Sheets

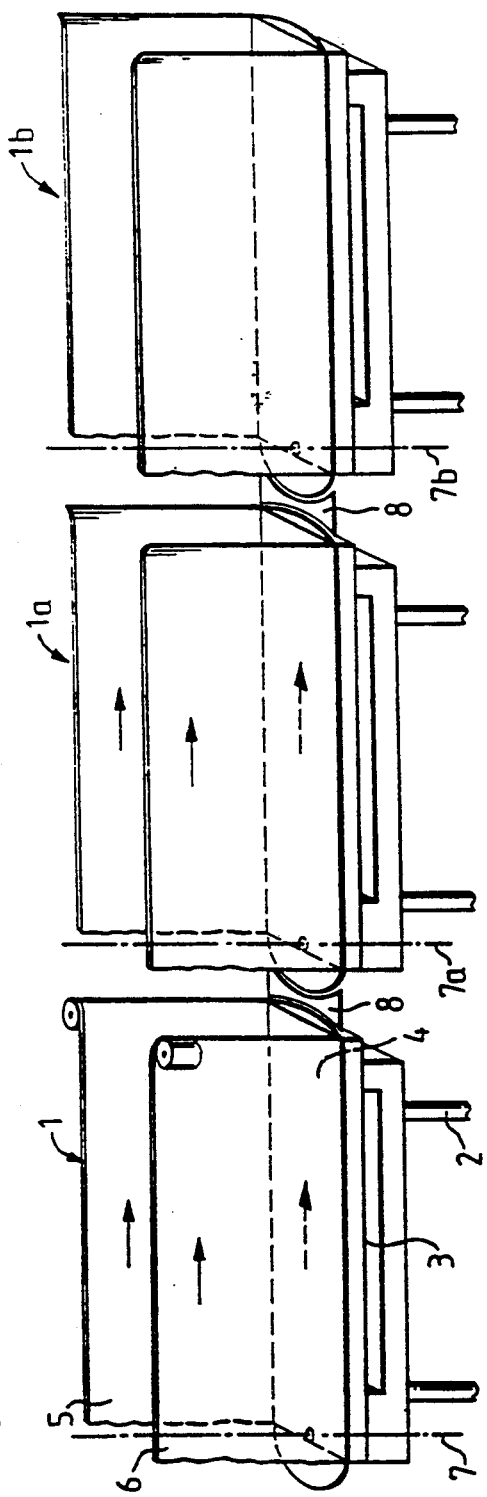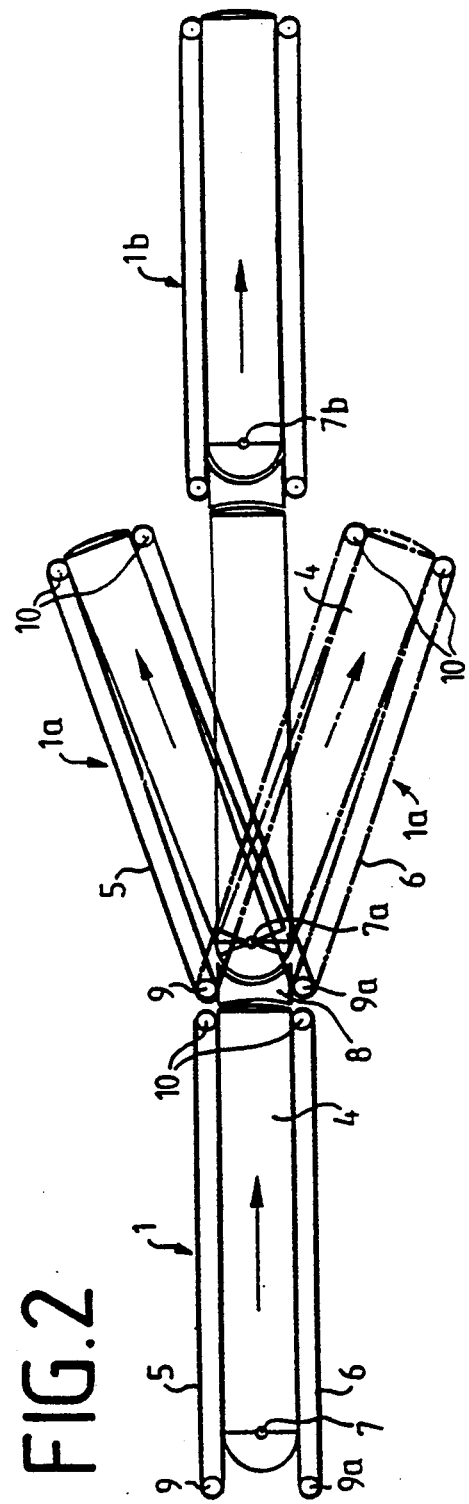

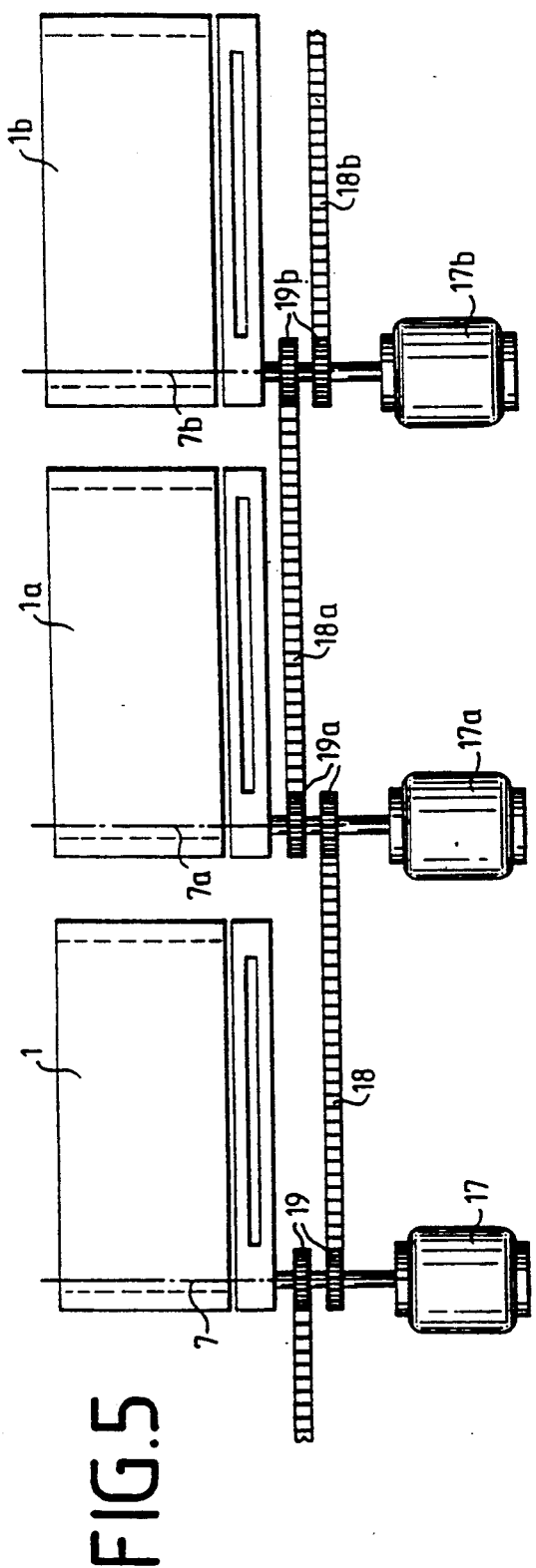
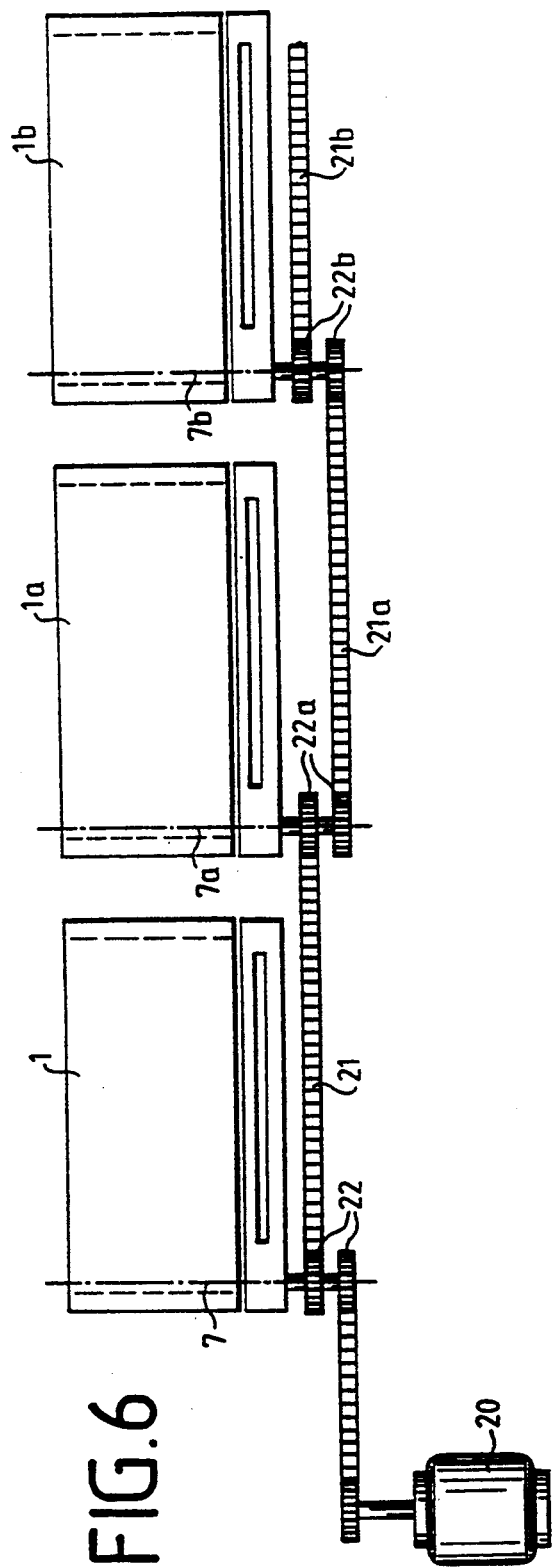
FIG.5
FIG.6

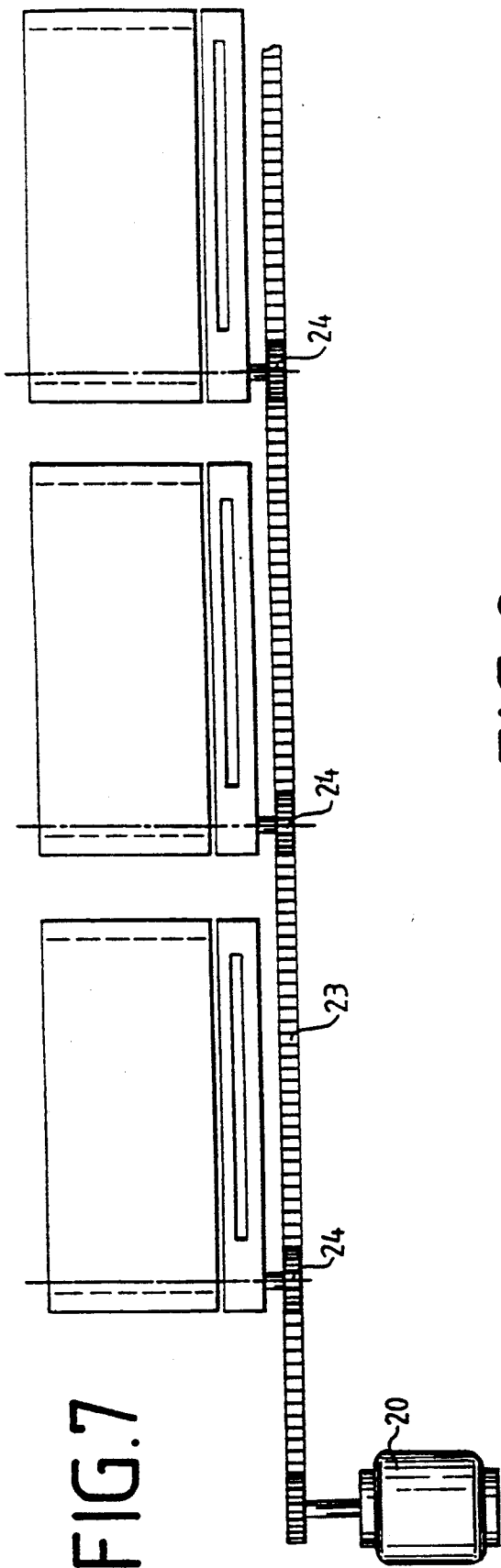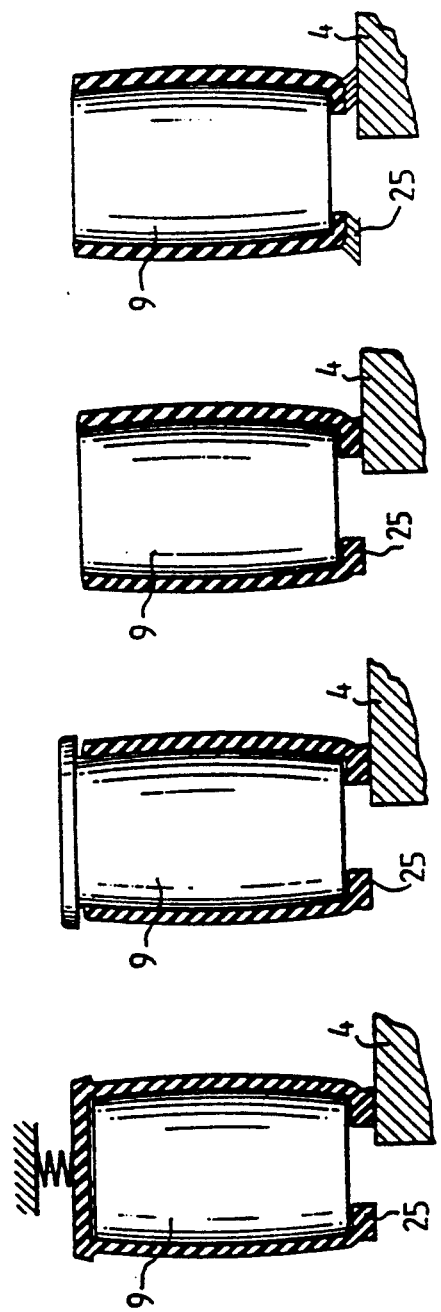

MODULAR CONVEYOR

BACKGROUND OF THE INVENTION

The present invention relates to a modular conveyor system for the transport and distribution of goods of various types, shapes, surfaces, weight and consistency. Already known are conveyor systems in which the goods are transported over conveyor belts equipped with switches, rollers, transversely extending belts, and can be transferred out at various target locations. The goods must here be adapted to the belt conditions. Reliable transport and malfunction-free distribution are very dependent on the frictional relationships between the goods and the belt. In particular, loose and lightweight goods, such as paper, loose newspapers and magazines, may fall off the belt or be blown away. In connection with these goods, there also exists the danger of malfunctions at switches and branch-offs and in the region of the outward transfer. On the other hand, for materials welded into plastic there exists the danger of adhesion to the conveyor belt. Moreover, in such systems, if guide means such as slide planes or the like are employed along the sides of the conveyor belts, relative movements occur between the material being transported and these guide means so that there exists the danger of damage to the goods being transported.

Other conveyor systems are based on container transport on rails, rollers or wheels, or on dump-tray techniques. The drawbacks of these systems are that the containers or trays must be returned and that the ballistic ejection of the goods being transported when they are transferred out exerts greater forces on the goods.

The present invention intends to avoid the drawbacks of the prior art conveying devices. In particular, it is an object of the present invention to provide a conveyor system in which a defined and reliable guidance of the goods takes place along a continuous conveying path during the entire transporting and distribution process, in which contact and friction of the goods at guide means and switches are minimized, in which the goods assume no undefined states during outward transfer, and in which the influence of the surface consistency of the goods being transported on the transporting and distribution process is minimized.

The above object is generally realized by the present invention by a modular conveyor arrangement for transporting and distributing discreet or continuous goods comprising two or more aligned conveyor modules attached to a basic frame, with each conveyor module including a rack on which a bottom conveyor and two lateral guide conveyors are mounted, and with the rack of each conveyor module being movable, relative to the frame and the other conveyor modules, for discharging goods out of the respective conveyor module.

The invention is based on the realization that in a conveyor belt system a relative movement between the goods and the transporting means can be avoided and simultaneously defined guidance and outward transfer of the goods can be realized in that the conveyor system is composed of conveyor modules in which two lateral belts are arranged parallel to an underfloor belt, with the belts, that is, the underfloor belt and the lateral belts, being mounted on a rack and the rack of each conveyor module is movable, when the belts are moving, so that the goods can be transferred out of the conveyor module in question.

The invention will be described below with reference to the drawing figures.

BRIEF DESCRIPTION OF THE DRAWING

FIG. 1 is a schematic isometric side view, partially broken away, of a conveyor arrangement including a plurality of conveyor modules according to the invention.

FIG. 2 is a schematic plan view of the conveyor arrangement according to the invention illustrating pivotal movement of one of the modules.

FIGS. 5, 6 and 7 are schematic illustrations showing various common drive arrangements for the plurality of conveyor modules of the conveyor system.

FIG. 8 is a schematic side view, partially in section, illustrating various configurations of a modification according to the invention of a drive roller for the lateral guide conveyors.

DETAILED DESCRIPTION OF THE PREFERRED EMBODIMENTS

Figure 3:
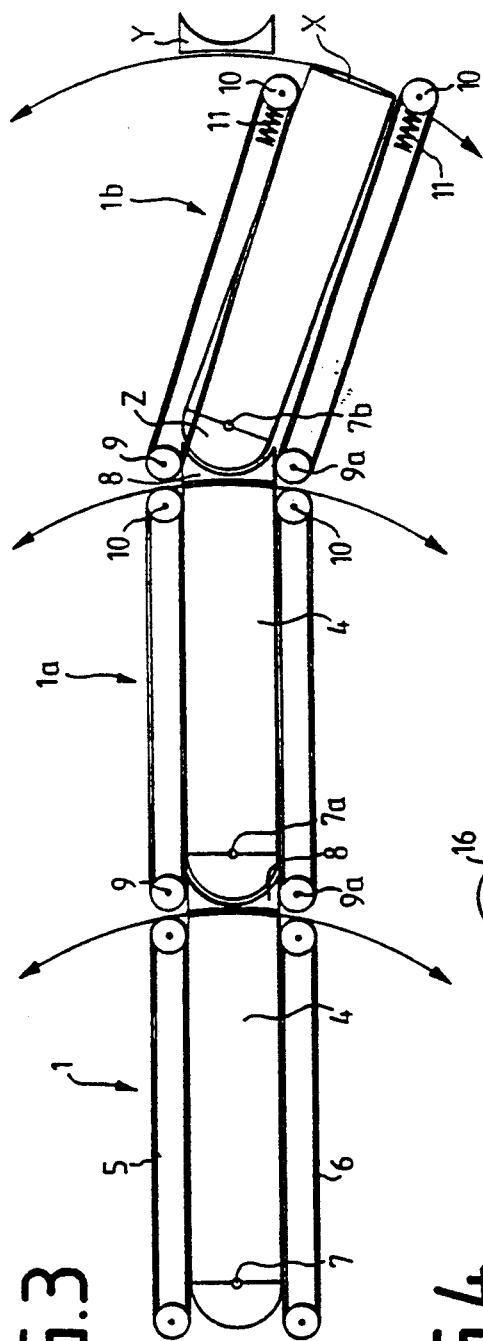
FIG. 3 is an enlarged schematic plain view of a conveyor system according to the invention showing a modification of the arrangement of FIG. 2.

FIG. 1 shows a sequence of three aligned or lined up conveyor modules 1, 1a, 1b of the conveyor system according to the invention. The conveying direction goes from module 1 to module 1a. A conveyor module 1 is thus composed of a basic frame 2 on which a rotatable rack 3 is mounted which includes an underfloor belt 4 and two lateral belts 5 and 6. For simplification, the rollers guiding and driving conveyor belts 4, 5, 6 are not shown in FIG. 1. Rack 3 is rotatable relative to frame 2 about a pivot axis 7. Conveyor modules 1 and 1a are connected by an intermediate member 8 which performs the function of a metal slide sheet. As will be discussed in greater detail in connection with FIG. 3, intermediate member 8 is configured so that it is possible for conveyor module 1 to unimpededly rotate about pivot axis 7 as well as for conveyor module 1a to rotate about pivot axis 7a. If conveyor module 1 is not pivoted outwardly, conveyance occurs by way of intermediate member 8 from conveyor module 1 to conveyor module 1a. In order to avoid additional acceleration of the goods being transported while changing from one conveyor module to the other, the conveyor belts of all modules preferably move at the same speed. Also, in order to avoid friction between the goods being transported and the conveyor, the lateral belts 5, 6 of each module move in synchronism with the associated underfloor belt 4.

FIG. 2 is a top view of a conveyor system according to the invention. Here, the reference numerals 9 and 9a each identify fixed rollers of conveyor modules 1 and 1a for lateral belts 5 and 6. Rollers 10 are attached in rack 3 in such a way that, if the rack rotates about pivot point 7, there is no change in the tension or speed of movement of lateral belts 5, 6 (see FIG. 3).

The principle of operation of the conveyor according to the invention will initially be described with reference to FIGS. 1 and 2. As already mentioned, the goods are transported from conveyor module 1 to 1a whenever, with the conveyor belts running, modules 1 and 1a abut at intermediate member 8 and form a continuous conveying path. The transferring out of conveyed goods is effected in that one conveyor module, in FIG. 2 conveyor module 1a, is pivoted into pivot axis 7. The goods to be transferred out move by way of intermediate member 8 from a first conveyor module into a second pivoted-out conveyor module and are transported by the belts of this conveyor module toward its open end. It should be pointed out that in FIGS. 1 and 2, the outward pivoting is shown in the same plane, but it is just as possible to perform a pivoting movement for outward transfer toward the top or bottom, which can be realized in that the lateral belts are provided with the same coupling member 8 as provided according to FIG. 3 for the underfloor belt.

FIG. 3 illustrates the relationships during rotation of module 1b about pivot axis 7b. Each intermediate member 8 includes a moveable component X which has a segment-shaped outer surface and which, as shown, in attached at the front or pivoted end of each module rack, e.g., the rack 3 of module 1b. This segment shaped surface of component X fits into and abuts a correspondingly shaped concave surface of a fixed component Y. In this way, free movement about pivot point 7b is possible. A second concave surface of component Y cooperates with the outer surface of a semicircular or approximately semicircular component Z, which as shown is connected to the fixed or rear end of each module rack so that free movement about pivot axis 7b is also possible. The underfloor belt 4 moves in front of the respective inner edges of components X and Z of intermediate member 8, with a small clearance. A significant effect of this configuration of components X, Y, Z of the intermediate or coupling member 8 is that a pivoting movement does not change the gaps between the conveyor elements. In order to minimize friction between the goods being transported and intermediate member 8, the latter is preferably provided with a smoothed and/or suitably coated surface. Since the rearward rollers 9 and 9a of the lateral belts are stationary during the pivoting, a change in the gap at the side walls between modules 1a and 1b is prevented. During the pivoting, the underfloor belt must be moved rigidly around the pivot axis so as to avoid twisting of the belt surface. On the other hand, changing geometric conditions during the pivoting require resilient mounting of the forward rollers 10. This is indicated in FIG. 3 by spring elements 11. However, elements 11 may be omitted if a roll parallel to the forward roll takes care that the lateral belts 5 and 6 are guided in the form of a parallelogram.

The conveyor belts and the conveyor modules may be driven in various ways. In one embodiment, each conveyor belt is provided with a separate, controlled drive, with a control unit also ensuring that the three belts of each module are in synchronism with one another. A control unit also effects the synchronism between the conveyor belts and drives of the other conveyor modules. As an alternative to this solution, a central drive may also drive each module via chains, belts and toothed wheels, with only one drive motor being employed per module.

Figure 4:
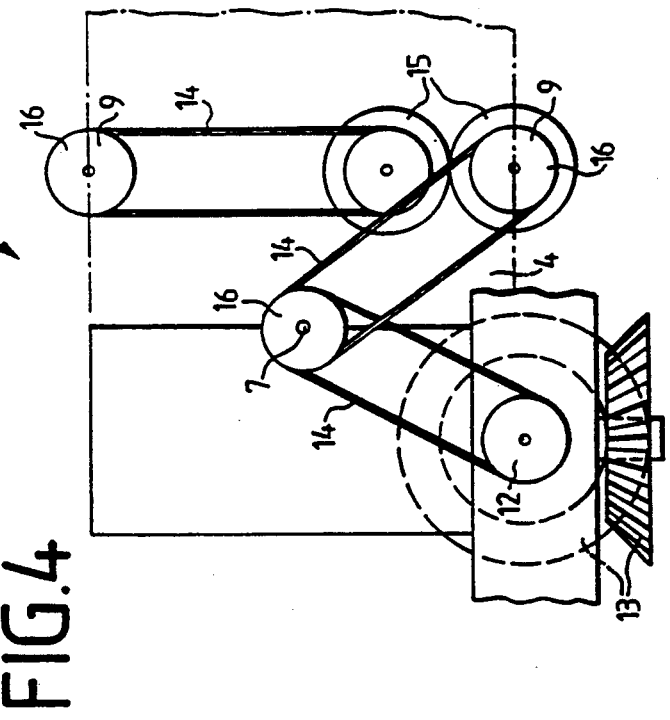
FIG. 4 is a schematic illustration of a synchronous drive for the bottom or floor conveyor and the two lateral guide conveyors of a module according to the invention.

FIG. 4 is an illustration of the gear mechanism for the synchronous drive of underfloor belt 4 and lateral belts 5 and 6. The rotation of the roller for the underfloor belt takes place about the central pivot point 7. Here, reference numeral 12 identifies a drive shaft, identifier 13 bevel gears for driving the support roller for the underfloor belt 14 identifier toothed in sprocket belts, 15 identifier spur wheels, and 16 identifier synchronous belt gears or sprockets for driving lateral rollers 9 and 9a.

FIG. 5 shows a further embodiment of the invention in which conveyor modules 1, 1a and 1b that are driven separately by respective motors 17, 17a and 17b, are driven in synchronism by ladder chains 18, 18a and 18b and toothed wheels 19, 19a and 19b.

FIGS. 6 and 7 show further embodiments of centrally driven transporting modules 1, 1a and 1b. Here, the reference numeral 20 identifies a central drive motor 21, 21a, 21b and the numeral 23 identify ladder chains, while numerals 22, 22a, 22b and 24 identify toothed wheels coupled with the ladder chains.

FIG. 8 illustrates a further embodiment of the invention. In order to prevent objects, such as thin paper, from sliding between the perpendicularly arranged conveyor belts 4 and 5 or 6, respectively, elastic seams or brushes are attached to the lower edges of the vertical rollers 9 and 10. These seams or brushes may also be attached to the lower edge of lateral metal sheets disposed behind the lateral belts and in both cases act as an elastic seal between the lateral belt 4 or 5 and the underfloor belt 4.

Figure 9:
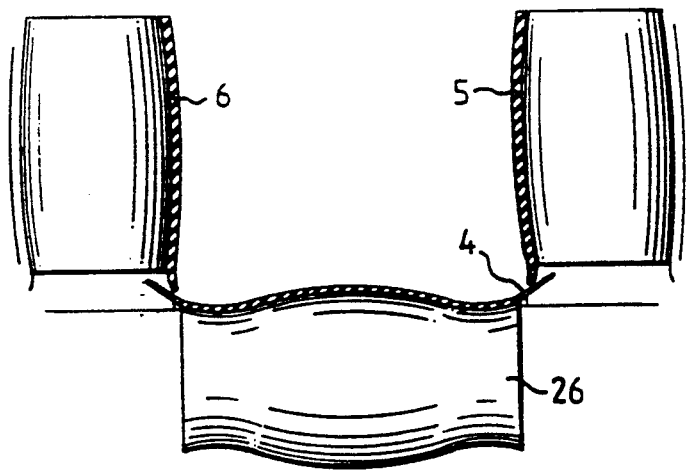
FIG. 9 shows the relationship between the floor and lateral conveyor belts with a modification according to the invention of the shape of the roller for the conveyor belts.

In order to increase the pressure of the lateral belts on the lower belt and thus increase the sealing effect between the two lateral belts 5 and 6 and the underfloor belt 4, the rollers may be given a spherical shape so that there occurs a lateral pressure of the lower edges of the lateral belts on the underfloor belt. This is shown in FIG. 9 for a spherical roller 26 for the underfloor belt 4.

Figure 10:
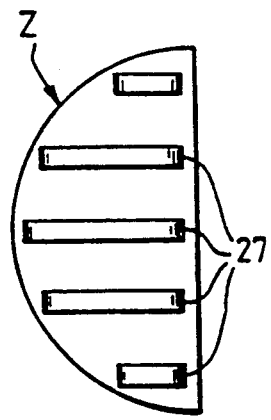
FIGS. 10 and 11 are respective plan views of one component of the intermediate member between adjacent modules according to the invention provided with respective additional conveying arrangements according to respective modifications of the invention.
Figure 11:
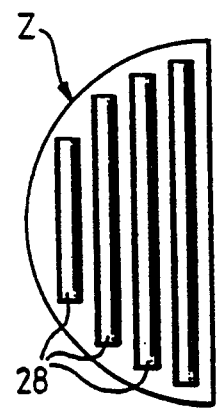

FIG. 10 shows a further-embodiment of the invention in which belts 27 are incorporated in the lower metal guide sheet Z of coupling member 8. Belts 27 have the effect that the goods are also transported in the region of coupling members 8. By suitably selecting the speed of belts 27, it is possible to compensate for possible friction of the goods being transported. This may also be effected with rollers 28 which are incorporated in component Z of coupling member 8 as shown in FIG. 11.

In simplified embodiments of the conveyor according to the invention, the driven lateral belts may be omitted and replaced by free-running belts or suitable metal guide sheets. Moreover, in an apparatus in which upward or downward pivoting is provided, the lateral belts may be fixed so that only the underfloor belt is pivotal upwardly or downwardly.

Although the invention has been illustrated with reference to a certain pivoting mechanism, it is clear to the person skilled in the art that other pivoting mechanisms can also be employed in a conveyor according to the invention. Moreover, the conveyor belts may be replaced by driven rollers or other transporting mechanisms, such as, for example, vibratory conveyors.

I claim:

1. A modular conveyor arrangement comprising: at least two aligned conveyor modules attached to a base frame, with each said conveyor module including a rack, a floor conveyor means mounted on said rack and extending from a front to a rear thereof, means for mounting said rack on said base frame for movement relative to said frame and the other conveyor modules for discharging goods out of the respective conveyor module, and two lateral guide conveyor means normally extending along the respective lateral edges of said floor conveyor means and mounted for rotation about a front axis disposed on said rack adjacent a front end thereof and about a fixed rear axis; and, means for forming a continuous conveying path between adjacent aligned conveyor modules including an intermediate segment disposed between adjacent modules and means, disposed on said racks of adjacent said modules, for abutting said intermediate member while permitting said movement.

2. A modular conveyor arrangement according to claim 1, wherein said means for mounting said rack mounts said rack for rotation about a pivot axis relative to the base frame.

3. A modular conveyor arrangement according to claim 1, wherein said floor conveying means is an underfloor belt conveyor.

4. A modular conveyor arrangement according to claim 1, wherein each said lateral guide conveyor means include a respective lateral belt having fixed rear rollers.

5. A modular conveyor arrangement according to claim 2, wherein said means for abutting includes respective first and second members disposed at the respective facing ends of said racks of adjacent said modules, with each of said first and second members having a curved outer surface and an inner surface disposed with a small gap adjacent an end of the associated floor conveying means; and said intermediate segment has opposed curved surfaces which are adapted to and abut respective said curved outer surfaces of said first and second members.

6. A modular conveyor arrangement according to claim 5, wherein at least one of said intermediate segment and said first and second members is provided with one of belts and rollers for conveying goods between adjacent said modules.

7. A modular conveyor arrangement according to claim 1, wherein said floor conveyor means and said two lateral guide conveyor means respectively comprise an underfloor belt and two lateral belts, each driven by and supported on respective rollers.

8. A modular conveyor arrangement according to claim 7, wherein said means for mounting mounts said rack for rotation relative to said frame about a pivot axis adjacent a rear end of said module so that a forward end of said rack can be pivoted out of alignment with an adjacent module; and the respective said rollers for said lateral belts at said forward end of said rack are resiliently supported by spring elements.

9. A modular conveyor arrangement according to claim 7, wherein at least some of said rollers have a spherical configuration.

10. A modular conveyor arrangement according to claim 7, further comprising one of an elastic member and a brush disposed at a lower edge of said rollers for said lateral belts and contacting an upper surface of said underfloor belt.

11. A modular conveyor arrangement according to claim 1, further comprising a common drive means, including bevel gears and toothed belts, for driving said floor conveyor means and said lateral guide conveyor means.

12. A modular conveyor arrangement according to claim 1, further comprising common drive means, including toothed wheels and ladder chains, for driving said floor conveyor means and said lateral guide conveyor means.

13. A modular conveyor arrangement for transporting and distributing discreet or continuous goods by means of conveyor belts, said arrangement comprising: at least two aligned conveyor modules attached to a base frame, with each said conveyor module including a rack, a floor conveyor belt and two lateral conveyor belts mounted on said rack, and means for mounting said rack on said frame for movement relative to said frame and the other of said conveyor modules to discharge goods out of the respective conveyor module; and a respective intermediate member disposed between adjacent of said conveyor modules, said intermediate member being composed of first and second components each associated and moveable with a respective conveyor module and having respective facing curved surfaces, one of which is semicircular, and a further fixed component disposed between said first and second components and having opposed surfaces which conform with and contact the respective said outer surfaces of said first and second components.

14. A modular conveyor arrangement according to claim 13, further comprising one of conveyor belts and rollers on an upper surface of at least one of said components of said intermediate member for conveying goods between adjacent said modules.

15. A modular conveyor arrangement according to claim 13, wherein said means for mounting said rack mounts the associated said rack for rotation about a pivot axis relative to said frame.

16. A modular conveyor arrangement for transporting and distributing discreet or continuous goods by means of conveyor belts, said arrangement comprising: at least two aligned conveyor modules attached to a base frame, with each conveyor module including a rack, an underfloor conveyor belt and two lateral guide conveyor belts mounted on said rack, and means for mounting the respective said rack for rotation, relative to said frame and the other of said conveyor modules, about a pivot axis adjacent a rear end of said module so that a forward end of said rack can be pivoted out of alignment with an adjacent module in order to discharge goods out of the respective conveyor module; and wherein said lateral conveyor belts and said underfloor conveyor belt are supported and driven by respective rollers, including rollers disposed at said forward end of said rack, and said rollers of said lateral conveyor belts disposed at said forward end of said rack are resiliently supported by spring elements.

* * * * *